United States Patent
Kato et al.

[11] Patent Number: 5,819,531
[45] Date of Patent: Oct. 13, 1998

[54] CONTROL DEVICE FOR ELECTRICALLY-HEATED CATALYZERS

[75] Inventors: Hiroaki Kato; Yuichi Shimasaki; Hironao Fukuchi; Akihisa Saito; Hideo Furumoto, all of Wako; Takayoshi Nakayama, Tochigi-ken, all of Japan

[73] Assignee: Honda Giken Kogyo Kabushiki Kaisha, Tokyo, Japan

[21] Appl. No.: 803,444

[22] Filed: Feb. 20, 1997

[30] Foreign Application Priority Data

Feb. 22, 1996 [JP] Japan .................................. 8-058276

[51] Int. Cl.$^6$ ........................................ F01N 3/00
[52] U.S. Cl. .................. 60/277; 60/284; 60/286; 60/300
[58] Field of Search .................. 60/277, 284, 286, 60/300

[56] References Cited

U.S. PATENT DOCUMENTS 5,553,451  9/1996  Harada ...................... 60/300
5,555,725  9/1996  Shimasaki et al. ........... 60/277
5,600,949  2/1997  Kato et al. ................... 60/284

FOREIGN PATENT DOCUMENTS 4-51659  8/1992  Japan .
8-61048  3/1996  Japan .

Primary Examiner—Thomas E. Denion
Attorney, Agent, or Firm—Nikaido, Marmelstein, Murray & Oram LLP

[57] ABSTRACT

A control device is provided for controlling an electrically-heated catalyzer of an internal combustion engine. Electric power generated by an alternator driven by the engine is supplied to the electrically-heated catalyzer. At least one electrical parameter dependent on the electric power supplied to the electrically-heated catalyzer is detected. It is determined that the electrically-heated catalyzer is abnormal when the at least one electrical parameter falls outside a predetermined range. The predetermined range is changed according to the rotational speed of the engine detected by an engine rotational speed sensor.

7 Claims, 4 Drawing Sheets

CONTROL DEVICE FOR ELECTRICALLY-HEATED CATALYZERS

BACKGROUND OF THE INVENTION

1. Field of the Invention

This invention relates to a control device for electrically-heated catalyzers provided in exhaust systems of internal combustion engines, and more particularly to a control device of this kind, which is capable of determining abnormality of the electrically-heated catalyzer.

2. Prior Art

A catalyzer employed in an internal combustion engine, for purifying exhaust gases emitted from the engine does not become activated until a considerable time period elapses after the start of the engine when the engine is started in a cold state. To accelerate the activation of the catalyzer, there is conventionally employed an electrically-heated catalyzer which is electrically heated to become promptly activated, by electric power supplied from an alternator driven by the engine.

Further, a control device for an electrically-heated catalyzer of this kind has already been proposed by the present assignee, which detects voltage and/or electric current supplied to the electrically-heated catalyzer and determines that the catalyzer is abnormal when the detected voltage and/or electric current assumes a value falling outside a predetermined range (Japanese Laid-Open Patent Publication (Kokai) No. 8-61048).

On the other hand, there has conventionally been used an intake air amount control system for internal combustion engines, as proposed e.g. by Japanese Laid-Open Patent Publication (Kokoku) No. 4-51659, which includes a solenoid valve arranged in a bypass passage connected to an intake pipe of the engine in a fashion bypassing a throttle valve arranged therein. The proposed system controls the amount of intake air supplied to the engine during idling thereof through feedback control of the opening of the solenoid valve by the use of a control amount, more specifically, an amount of electric current to be supplied to the solenoid valve, based on the difference between the actual engine rotational speed and a desired engine rotational speed.

In an internal combustion engine employing both the proposed control device for the electrically-heated catalyzer and the conventional intake air amount control system, however, if the desired engine rotational speed is set based on the temperature of the engine during idling of the engine to thereby control the amount of intake air supplied to the engine such that the actual engine rotational speed becomes equal to the desired engine rotational speed, electric power generated by the alternator driven by the engine changes depending on the engine temperature, which hinders accurate determination of abnormality of the electrically-heated catalyzer.

SUMMARY OF THE INVENTION

It is the object of the invention to provide a control device for an electrically-heated catalyzer, which is capable of performing accurate determination of abnormality of the electrically-heated catalyzer irrespective of changes in the rotational speed of the engine during idling thereof.

To attain the above object, the present invention provides a control device for controlling an electrically-heated catalyzer of an internal combustion engine for an automotive vehicle, the engine having an exhaust system, the electrically-heated catalyzer being arranged in the exhaust system, the vehicle having installed thereon the engine, an alternator driven by the engine, and the electrically-heated catalyzer, electric power generated by the alternator being supplied to the electrically-heated catalyzer, the control device including switching means for selectively permitting supply of the electric power to the electric electrically-heated catalyzer, electrical parameter-detecting means for detecting at least one electrical parameter dependent on the electric power supplied to the electrically-heated catalyzer, and abnormality-determining means for determining that the electrically-heated catalyzer is abnormal when the at least one electrical parameter falls outside a predetermined range.

The control device according to the invention is characterized in that the control device includes engine rotational speed-detecting means for detecting rotational speed of the engine, and the abnormality-determining means changes the predetermined range according to the rotational speed of the engine detected by the engine rotational speed-detecting means.

Preferably, upper and lower limit values defining the predetermined range are set to higher values as the rotational speed detected by the engine rotational speed-detecting means is higher.

More preferably, the at least one electrical parameter detected by the electrical parameter-detecting means is at least one of a value of electric current, a value of voltage, and a value of electric power, of the electric power supplied to the electrically-heated catalyzer.

Preferably, the control device includes means for causing the switching means to stop supply of the electric power to the electrically-heated catalyzer when the abnormality-determining means determines that the electrically-heated catalyzer is abnormal.

Preferably, the engine includes engine temperature-detecting means for detecting a temperature of the engine, and engine rotational speed control means for controlling the rotational speed of the engine to a desired engine rotational speed value dependent on the temperature of the engine detected by the engine temperature-detecting means when the engine is in a predetermined operating condition.

Preferably, the engine includes an intake passage, and a throttle valve arranged in the intake passage, the engine rotational speed control means comprising a bypass passage bypassing the throttle valve, and an intake air amount control valve arranged in the bypass passage for controlling an amount of air supplied to the intake passage at a location downstream of the throttle valve.

More preferably, the predetermined operating condition of the engine is an idling condition of the engine, and the desired engine rotational speed value is set to a higher value as the temperature of the engine detected by the engine temperature-detecting means is lower.

The above and other objects, features, and advantages of the invention will be more apparent from the following detailed description taken in conjunction with the accompanying drawings.

DETAILED DESCRIPTION

The invention will now be described in detail with reference to the drawings showing an embodiment thereof.

Figure 1:
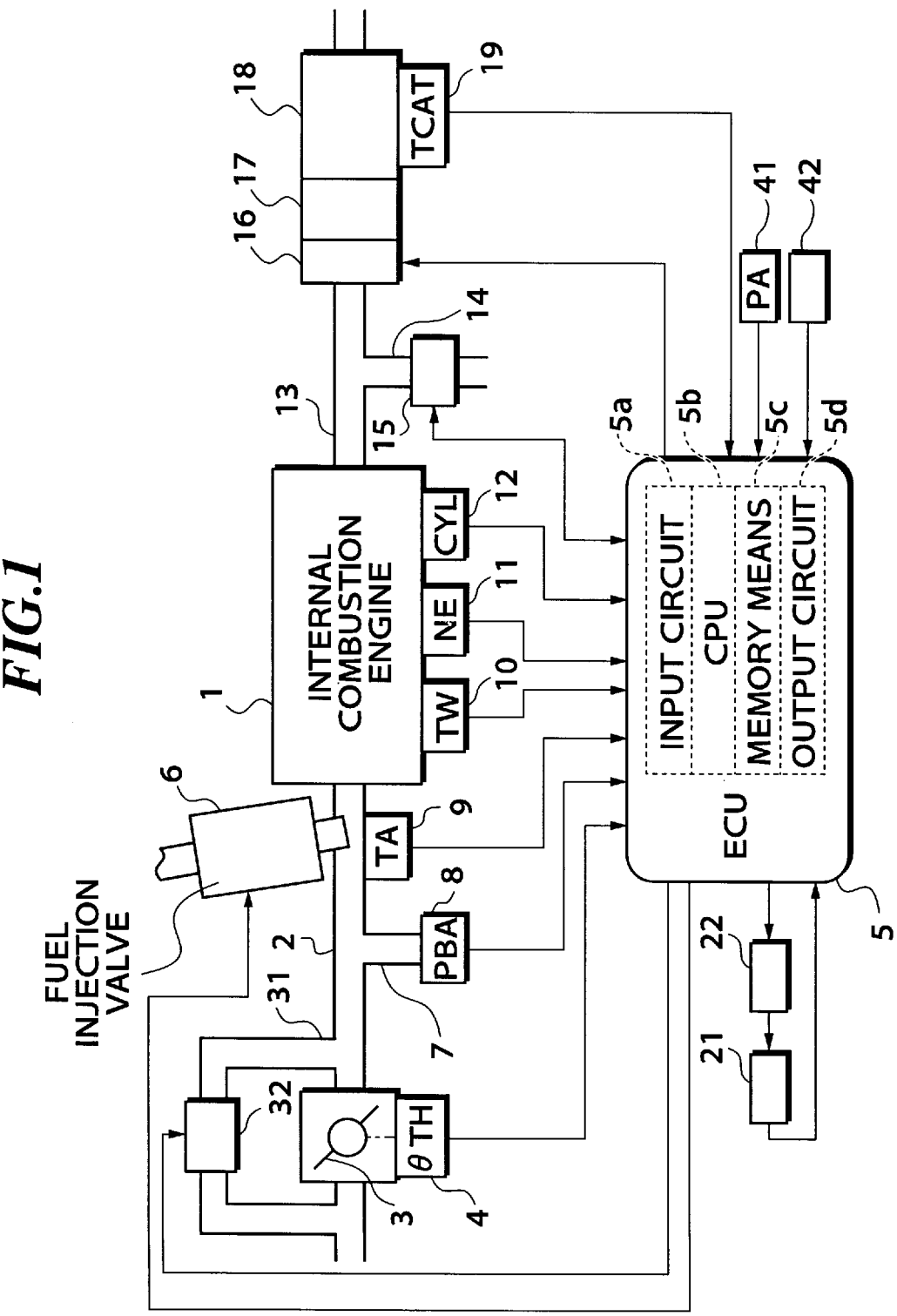
FIG. 1 is a block diagram schematically showing the whole arrangement of an internal combustion engine and a control system therefor including a control device for an electrically-heated catalyzer, according to an embodiment of the invention.

Referring first to FIG. 1, there is illustrated the whole arrangement of an internal combustion engine and a control system therefor including a control device for an electrically-heated catalyzer, according to an embodiment of the invention. In the figure, reference numeral 1 designates an internal combustion engine (hereinafter referred to as "the engine"), which has an intake pipe 2 connected to the cylinder block of the engine 1, in which is arranged a throttle valve 3. A throttle valve opening (θTH) sensor 4 is connected to the throttle valve 3, for generating an electric signal indicative of the sensed throttle valve opening θTH to an electronic control unit (hereinafter referred to as "the ECU") 5.

A bypass passage 31 is connected to the intake pipe 2 in a fashion bypassing the throttle valve 3. The bypass passage 31 has a solenoid valve 32 arranged therein for controlling the amount of intake air supplied to the engine during idling thereof. The solenoid valve 32 is electrically connected to the ECU 5. The ECU 5 controls control current ICMD to be supplied to a solenoid of the solenoid valve 32, to thereby control the amount of opening of the solenoid valve 32, i.e. the intake air amount.

Fuel injection valves 6, only one of which is shown, are each provided for each cylinder and arranged in the intake pipe 2 at a location intermediate between the engine 1 and the throttle valve 3 and slightly upstream of an intake valve, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is connected via a conduit 7 to the intake pipe 2 at a location immediately downstream of the throttle valve 3, for sensing absolute pressure PBA within the intake pipe 2, and is electrically connected to the ECU 5, for supplying an electric signal indicative of the sensed absolute pressure PBA to the ECU 5. Further, an intake air temperature (TA) sensor 9 is inserted into the intake pipe 2 at a location downstream of the PBA sensor 8, for supplying an electric signal indicative of the sensed intake air temperature TA to the ECU 5.

An engine coolant temperature (TW) sensor 10, which may be formed of a thermistor or the like, is mounted in the cylinder block of the engine 1, which is filled with coolant, for supplying an electric signal indicative of the sensed engine coolant temperature TW to the ECU 5.

An engine rotational speed (NE) sensor 11 and a cylinder-discriminating (CYL) sensor 12 are arranged in facing relation to a camshaft or a crankshaft of the engine 1, neither of which is shown. The NE sensor 11 generates a signal pulse (hereinafter referred to as "the TDC signal pulse") at each of predetermined crank angles (e.g. whenever the crankshaft rotates through 180 degrees when the engine is of a 4-cylinder type) which each correspond to a predetermined crank angle before a top dead point (TDC) of each cylinder corresponding to the start of the suction stroke of the cylinder, while the CYL sensor 12 generates a signal pulse at a predetermined crank angle of a particular cylinder of the engine, both of the pulses being supplied to the ECU 5.

An electrically-heated catalyzer (hereinafter referred to as "the EHC") 16, a starting catalyzer 17, and a three-way catalyzer 18 are arranged in an exhaust pipe 13 connected to the engine 1 in this order from an upstream side thereof, for purifying noxious components in exhaust gases from the engine, such as HC, CO, and NOx. The starting catalyzer 17 is a small-sized catalyzer provided mainly for purifying exhaust gases emitted from the engine immediately after starting thereof.

Extending from the exhaust pipe 13 is a passage 14 for supplying secondary air into the exhaust pipe 13 at a location upstream of the EHC 16, in which is arranged an air pump 15.

The EHC 16 and the air pump 15 are electrically connected to the ECU 5 to have their operations controlled by signals from the ECU 5. Further, a catalyst temperature sensor 19 is connected to the three-way catalyzer 18, for supplying an electric signal indicative of the sensed catalyzer temperature TCAT to the ECU 5.

Further, an alternator 21, which is driven by the engine 1, is electrically connected to the ECU 5 via a regulator 22 such that voltage of electricity generated by the alternator 21 is controlled by a signal from the ECU 5. More specifically, the ECU 5 delivers to the regulator 22 a command signal for setting a duty factor DUTY of a field winding of the alternator 21 to thereby control voltage generated by the alternator 21.

Also connected to the ECU 5 are an atmospheric pressure sensor 41 for detecting atmospheric pressure PA and an operative state detector 42 for detecting operative states of electric devices 43, and electric signals indicative of the sensed atmospheric pressure PA and operative states of the electric devices 43 are supplied to the ECU 5. The operative state detector 42, which is mounted on an automotive vehicle on which the engine 1 is installed, detects operative states of the electric devices 43, i.e. an air conditioner, an automatic transmission, a power steering system, and other electric devices including headlights and a window heater, as electric loads on the alternator 21, and supplies the ECU 5 with signals respectively indicative of whether the air conditioner is on or off, whether or not the shift position of the automatic transmission is in a drive range, whether or not the power steering system is in operation, and ON/OFF states of the other electric devices (i.e. the headlights, the window heater, etc.).

The ECU 5 is comprised of an input circuit 5a having the functions of shaping the waveforms of input signals from various sensors, shifting the voltage levels of sensor output signals to a predetermined level, converting analog signals from analog-output sensors to digital signals, and so fourth, a central processing unit (hereinafter referred to as "the CPU") 5b, memory means 5c storing various operational programs which are executed by the CPU 5b and for storing results of calculations therefrom, etc., and an output circuit 5d which delivers control signals to the fuel injection valves 6, air pump 15, solenoid valve 32, EHC 16, regulator 22, etc., for driving the same.

The CPU 5b calculates the control current ICMD to be supplied to the solenoid valve 32, an energization time period TEHC over which the EHC 16 is to be energized and the duty factor DUTY of the field winding of the alternator 21, and determines whether or not the EHC 16 is operating normally, in response to the output signals from the sensors, to generate control signals based on results of the calculations and determination.

Figure 2:
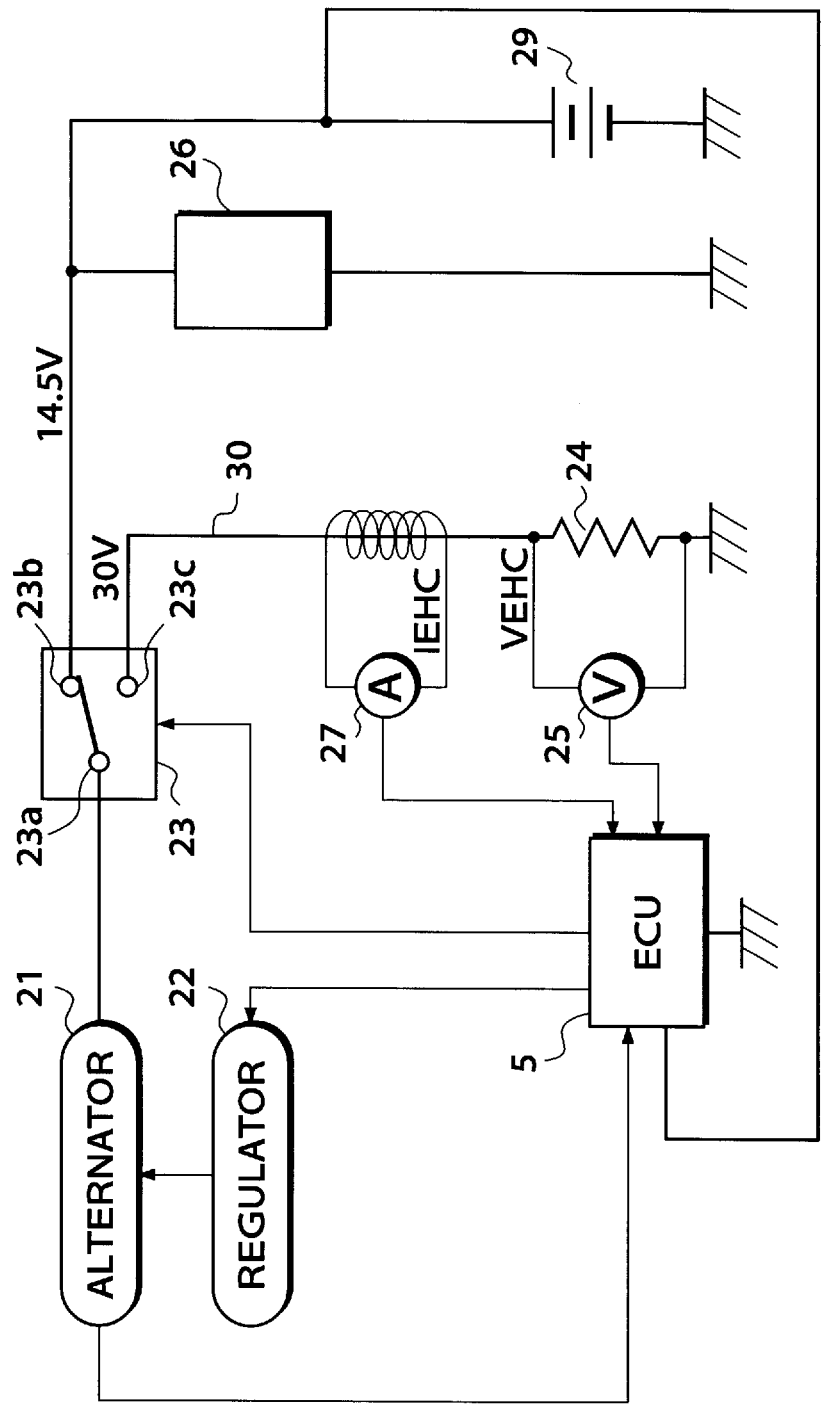
FIG. 2 is a circuit diagram showing the connection of a heater resistance of the electrically-heated catalyzer appearing in FIG. 1 and its related or peripheral circuit parts.

FIG. 2 shows a circuit formed by the ECU 5, the alternator 21, the regulator 22, a heater resistance 24 of the EHC 16, electrical equipment 26, and a battery 29. The EHC 16 employed in the present embodiment also acts as a heater, that is, it has a catalyst body thereof supplied with current to be heated thereby. The electrical resistance of the catalyst body is represented as the heater resistance 24.

The alternator 21 has an output thereof connected to a terminal 23a of a changeover switch 23 which has another terminal 23c connected to one end of the heater resistance 24 through a connecting line 30. The other end of the heater resistance 24 is grounded.

The changeover switch 23 has a further terminal 23b connected to a positive electrode of the battery 29 as well as to one end of the electrical equipment 26. The other end of the electrical equipment 26 is grounded. The battery 29 has its negative electrode grounded and its positive electrode connected to the ECU 5. The ECU 5 measures an output terminal voltage (hereinafter referred to "the output voltage") VB of the battery 29.

The changeover switch 23 is electrically connected to the ECU 5 to have its switching operation controlled by a signal from the ECU 5. The switch 23 is normally in a position shown in FIG. 2 in which the terminals 23a and 23b of the switch 23 are connected to each other, and controlled to be changed in position from its illustrated position immediately after the start of the engine 1, if required. Further, a voltage sensor 25 is connected to both ends of the heater resistance 24, to detect voltage VEHC across the heater resistance 24. The voltage sensor 25 is electrically connected to the ECU 5, for supplying a signal indicative of the sensed voltage VEHC across the heater resistance 24. Further, an electric current sensor 27 is provided on the connecting line 30, to detect heater current IEHC supplied to the heater resistance 24. The electric current sensor 27 is electrically connected to the ECU 5, for supplying a signal indicative of the sensed electric current to the ECU 5.

The switch 23 has its terminal connection changed such that the terminals 23a and 23c are connected to each other, only when the heater resistance 24 of the EHC 16 is to be energized. The energization time period TEHC over which the EHC 16 is required to be heated is determined based on the engine coolant temperature TW and the intake air temperature TA detected at the start of the engine 1. Further, according to the present embodiment, when the switch 23 is switched to the terminal 23b side, the output voltage from the alternator 21 is set to a first predetermined voltage VALT1 (e.g. 14.5 V). On the other hand, when the switch 25 is switched to the terminal 23c side, the output voltage from the alternator 21 is set to a second predetermined voltage VALT2 (e.g. 30 V) to thereby decrease the electric current supplied to the heater resistance 24 during the energization time period TEHC.

Next, a program for calculating the control current ICMD to be supplied to the solenoid valve 32, which is executed by the CPU 5b, will be described. This program is executed, for example, whenever a TDC signal pulse is generated, or at predetermined time intervals.

The control current ICMD is calculated by the use of the following equation (1) when the engine 1 is in a starting mode (i.e. cranking mode), while it is calculated by the use of the following equation (2) when the engine 1 is in a steady idling condition:

$$ICMD = (IXREFM + ILOAD) \times KIPA \quad (1)$$

$$ICMD = (IFB + ILOAD) \times KIPA \quad (2)$$

where IXREFM represents a predetermined current value for the starting mode of the engine 1, ILOAD an electric load-dependent correction term set based on states of electric loads on the alternator 21, KIPA a correction coefficient set according to atmospheric pressure PA, and IFB a feedback control term set according to the difference between the engine rotational speed NE and a desired engine rotational speed NEOBJ such that the former becomes equal to the latter. The desired engine rotational speed NEOBJ is set according to the engine coolant temperature TW, as shown in FIG. 4C. In the figure, it is assumed that predetermined values NE1 and NE2 are set e.g. to 500 rpm and 1350 rpm, respectively.

Figure 3:
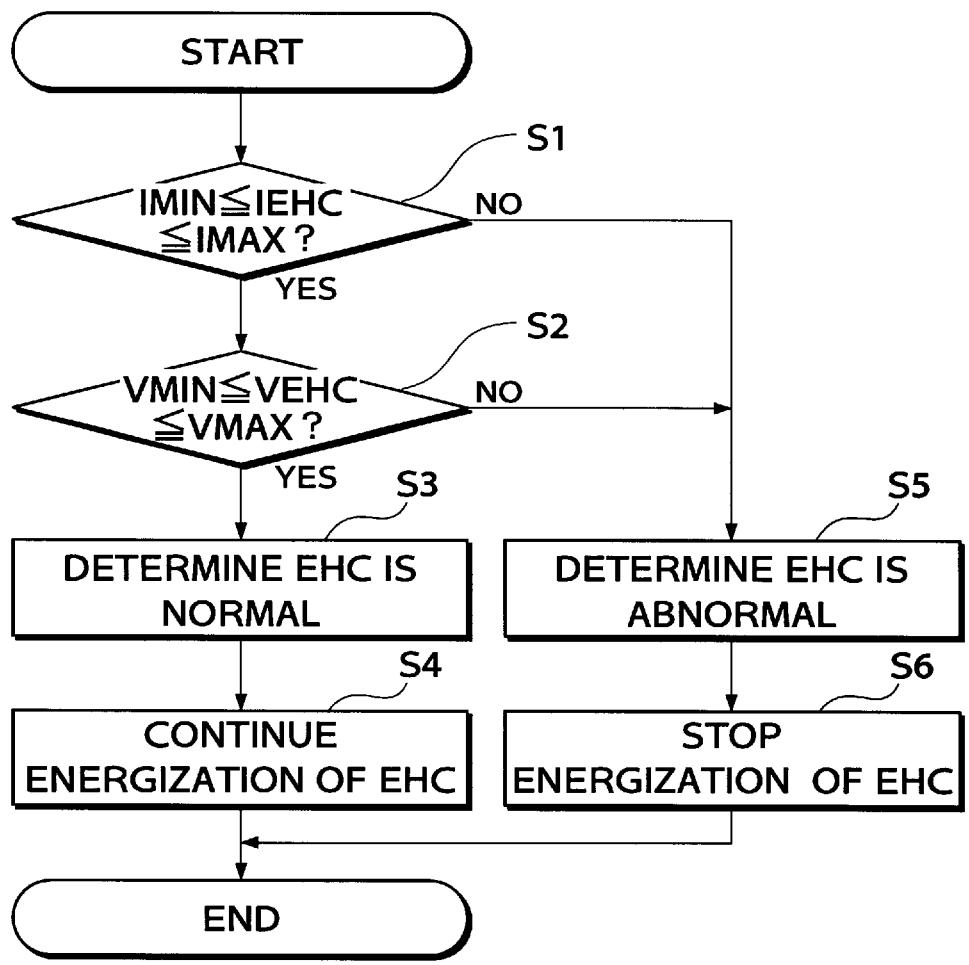
FIG. 3 is a flowchart showing a routine for determining abnormality of the electrically-heated catalyzer.

FIG. 3 shows a program for determining abnormality of the EHC 16, which is executed by the CPU 5b at predetermined time intervals when electric power is being supplied to the EHC 16.

First, at a step S1, it is determined whether or not the electric current IEHC detected by the electric current sensor 27 is within a range defined by predetermined upper and lower limit current values IMAX and IMIN. If IEHC>IMAX or IEHC<IMIN holds, it is judged at a step S5 that there is abnormality in the EHC 16, and the EHC 16 is stopped from being energized at a step S6, followed by terminating the program. More specifically, at the step S6, the output voltage of the alternator 21 is set to the first predetermined voltage VALT1, and the switch 23 is switched to the terminal 23b side.

If IMIN≦IEHC≦IMAX holds at the step S1, it is determined at a step S2 whether or not the voltage VEHC detected by the voltage sensor 25 is within a range defined by predetermined upper and lower limit voltage values VMAX and VMIN. If VEHC>VMAX or VEHC<VMIN holds at the step S2, the program proceeds to the step S5. On the other hand, if VMIN≦VEHC≦VMAX holds, it is judged at a step S3 that the EHC 16 is functioning normally, and energization of the EHC 16 is continued at a step S4, followed by terminating the program.

Figure 4A:
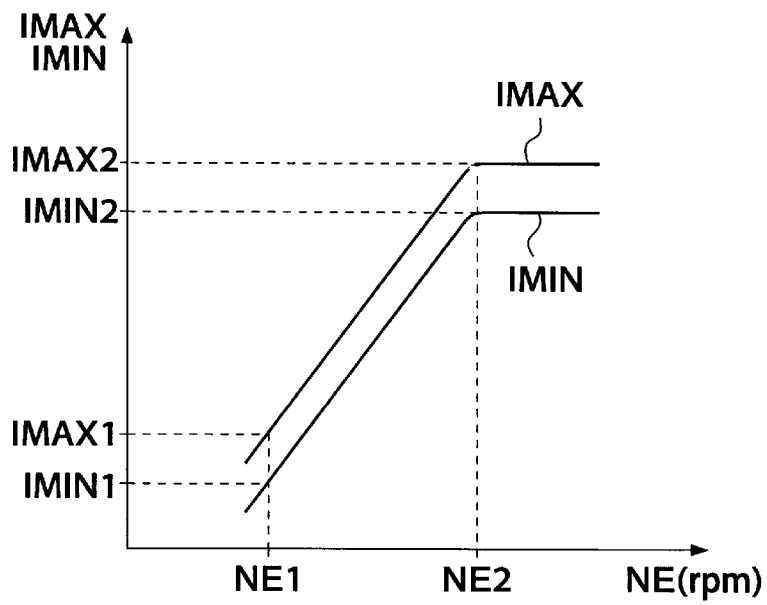
FIG. 4A is a graph showing the relationship between the rotational speed of the engine and predetermined upper and lower limit values of electric current supplied to the electrically-heated catalyzer.
Figure 4B:
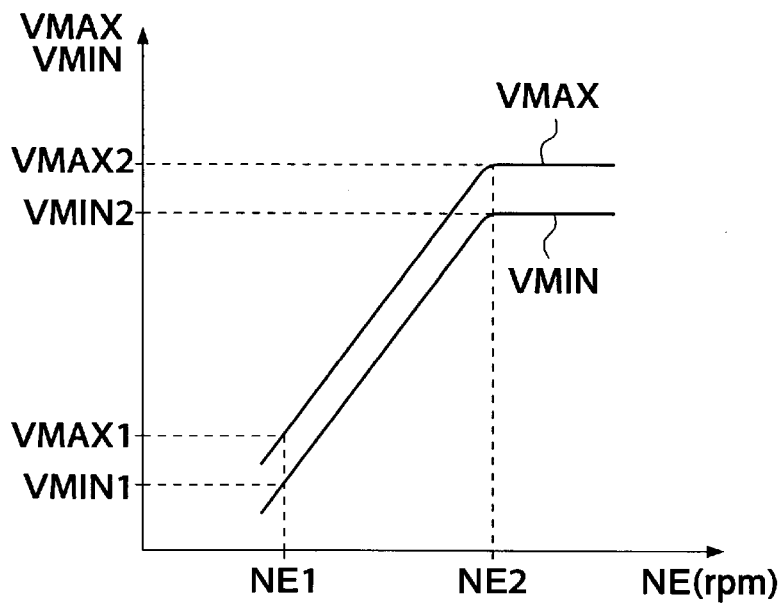
FIG. 4B is a graph showing the relationship between the rotational speed of the engine and predetermined upper and lower limit values of voltage applied to the electrically-heated catalyzer.
Figure 4C:
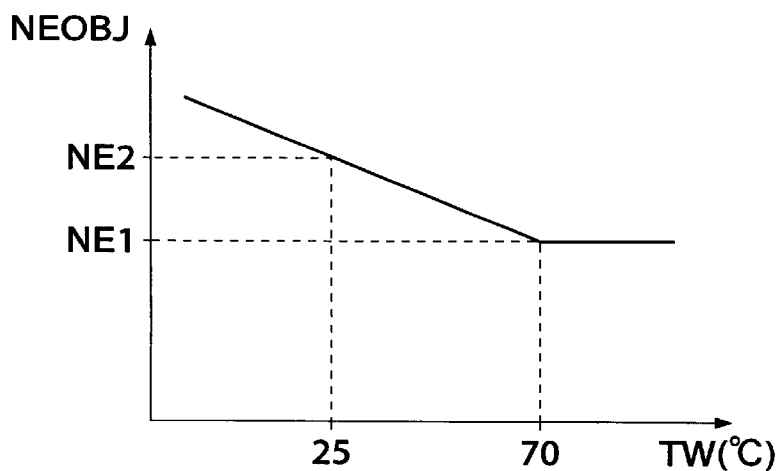
FIG. 4C is a graph showing the relationship between a desired engine rotational speed and engine coolant temperature.

The upper and lower limit current values IMAX and IMIN used at the step S1 are set to respective larger values, as the engine rotational speed NE is higher, e.g., as shown in FIG. 4A. The upper and lower limit voltage values VMAX and VMIN used at the step S2 are also set in the same manner (see FIG. 4B). The predetermined values NE1 and NE2 in FIGS. 4A and 4B are identical with those in FIG. 4C. Thus, the upper and lower limit values IMAX and IMIN, and VMAX and VMIN are set according to the engine rotational speed NE, which enables accurate determination of abnormality of the EHC 16 even if electric power generated by the alternator 21 changes with a change in the engine rotational speed.

This invention is not limited to the above described embodiment, but it may also be applied, for example, to a variation of the FIG. 2 circuit in which the switch 23 is omitted, while the output voltage of the alternator 21 is fixed to the first predetermined reference value VALT1, and the connecting line 30 is directly connected to the output of the alternator 21, with a switch arranged in the connecting line 30 for switching the EHC 16 between the ON state and the OFF state.

Further, although in the above embodiment, both of the electric current IEHC and the voltage VEHC are employed as electrical parameters for determining abnormality of the EHC 16, this is not limitative, but electric power IEHC× VEHC may also be used. In this case, the predetermined upper and lower limit values PMAX and PMIN are set in a similar manner to corresponding limit values set in FIGS. 4A and 4B.

Further, it is possible to employ either the electric current IEHC or the voltage VEHC as an abnormality-determining parameter.

What is claimed is:

1. In a control device for controlling an electrically-heated catalyzer of an internal combustion engine for an automotive vehicle, said engine having an exhaust system, said electrically-heated catalyzer being arranged in said exhaust system, said vehicle having installed thereon said engine, an alternator driven by said engine, and said electrically-heated catalyzer, electric power generated by said alternator being supplied to said electrically-heated catalyzer, said control device including switching means for selectively permitting supply of said electric power to said electric electrically-heated catalyzer, electrical parameter-detecting means for detecting at least one electrical parameter dependent on said electric power supplied to said electrically-heated catalyzer, and abnormality-determining means for determining that said electrically-heated catalyzer is abnormal when said at least one electrical parameter falls outside a predetermined range, the improvement wherein said control device includes engine rotational speed-detecting means for detecting rotational speed of said engine, and wherein said abnormality-determining means changes said predetermined range according to the rotational speed of said engine detected by said engine rotational speed-detecting means.

2. A control device according to claim 1, wherein upper and lower limit values defining said predetermined range are set to higher values as the rotational speed detected by said engine rotational speed-detecting means is higher.

3. A control device according to claim 2, wherein said at least one electrical parameter detected by said electrical parameter-detecting means is at least one of a value of electric current, a value of voltage, and a value of electric power, of said electric power supplied to said electrically-heated catalyzer.

4. A control device according to claim 1, including means for causing said switching means to stop supply of said electric power to said electrically-heated catalyzer when said abnormality-determining means determines that said electrically-heated catalyzer is abnormal.

5. A control device according to claim 1, wherein said engine includes engine temperature-detecting means for detecting a temperature of said engine, and engine rotational speed control means for controlling the rotational speed of said engine to a desired engine rotational speed value dependent on the temperature of said engine detected by said engine temperature-detecting means when said engine is in a predetermined operating condition.

6. A control device according to claim 1, wherein said engine includes an intake passage, and a throttle valve arranged in said intake passage, said engine rotational speed control means comprising a bypass passage bypassing said throttle valve, and an intake air amount control valve arranged in said bypass passage for controlling an amount of air supplied to said intake passage at a location downstream of said throttle valve.

7. A control device according to claim 6, wherein said predetermined operating condition of said engine is an idling condition of said engine, and said desired engine rotational speed value is set to a higher value as the temperature of said engine detected by said engine temperature-detecting means is lower.

* * * * *